(12) United States Patent
Stewart

(10) Patent No.: US 8,704,423 B2
(45) Date of Patent: Apr. 22, 2014

(54) ASYMMETRIC DIELECTRIC ELASTOMER COMPOSITE MATERIAL

(75) Inventor: Brian K. Stewart, Hayes, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 620 days.

(21) Appl. No.: 12/543,686

(22) Filed: Aug. 19, 2009

(65) Prior Publication Data

US 2010/0044069 A1    Feb. 25, 2010

Related U.S. Application Data

(60) Provisional application No. 61/091,017, filed on Aug. 22, 2008.

(51) Int. Cl.
| | | |
|---|---|---|
| *H01L 41/047* | (2006.01) | |
| *H02N 11/00* | (2006.01) | |
| *H02N 2/00* | (2006.01) | |
| *H01B 3/30* | (2006.01) | |
| *B05D 5/12* | (2006.01) | |

(52) U.S. Cl.
USPC ........... 310/309; 310/340; 310/363; 310/366; 310/800; 174/120 SR; 29/825; 428/221

(58) Field of Classification Search
USPC .......... 310/309, 363, 800; 977/724–725, 890; 156/280; 361/301.4
See application file for complete search history.

(56) References Cited

U.S. PATENT DOCUMENTS

| | | | | |
|---|---|---|---|---|
| 4,369,391 | A * | 1/1983 | Micheron | 310/332 |
| 4,500,377 | A * | 2/1985 | Broussoux et al. | 156/164 |
| 5,002,651 | A * | 3/1991 | Shaw et al. | 204/400 |
| 5,090,248 | A * | 2/1992 | Cimmino et al. | 73/780 |
| 5,101,319 | A * | 3/1992 | Diffeyes et al. | 361/321.2 |
| 6,477,029 | B1 * | 11/2002 | Sharma et al. | 361/233 |
| 6,583,533 | B2 * | 6/2003 | Kornbluh et al. | 310/309 |
| 6,646,364 | B1 * | 11/2003 | Horning et al. | 310/309 |
| 6,664,718 | B2 * | 12/2003 | Pelrine et al. | 310/330 |
| 6,781,284 | B1 * | 8/2004 | Pelrine et al. | 310/330 |
| 7,060,350 | B2 * | 6/2006 | Takaya et al. | 428/323 |
| 7,220,481 | B2 * | 5/2007 | Satsu et al. | 428/328 |

(Continued)

FOREIGN PATENT DOCUMENTS

| | | | | |
|---|---|---|---|---|
| JP | 06284750 | * 10/1994 | | H02N 1/00 |
| JP | 07-067360 | * 3/1995 | | H02N 1/00 |
| WO | 2006/121818 | * 11/2006 | | H02K 23/60 |

OTHER PUBLICATIONS

Machine Translation: jp 07-067360. "Electrode Structure for Electrostatic Actuator", Higuchi et al., Mar. 10, 1995.*

(Continued)

*Primary Examiner* — Burton Mullins
(74) *Attorney, Agent, or Firm* — Andrea Z. Warmbier; Robin W. Edwards

(57) ABSTRACT

Embodiments of the invention provide a dielectric elastomer composite material comprising a plurality of elastomer-coated electrodes arranged in an assembly. Embodiments of the invention provide improved force output over prior DEs by producing thinner spacing between electrode surfaces. This is accomplished by coating electrodes directly with uncured elastomer in liquid form and then assembling a finished component (which may be termed an actuator) from coated electrode components.

15 Claims, 10 Drawing Sheets

(56) References Cited

U.S. PATENT DOCUMENTS

| | | | |
|---|---|---|---|
| 7,411,331 B2 | 8/2008 | Dubowsky et al. | |
| 7,818,065 B2* | 10/2010 | Llinas et al. | 607/57 |
| 7,834,527 B2* | 11/2010 | Alvarez Icaza Rivera et al. | 310/344 |
| 8,299,352 B2* | 10/2012 | Pak et al. | 136/256 |
| 8,406,889 B2* | 3/2013 | Llinas et al. | 607/57 |
| 2002/0108704 A1* | 8/2002 | Umezawa et al. | 156/245 |
| 2006/0007514 A1* | 1/2006 | Desai | 359/224 |
| 2006/0192465 A1* | 8/2006 | Kornbluh et al. | 310/800 |
| 2007/0123963 A1* | 5/2007 | Krulevitch | 607/115 |
| 2008/0022517 A1* | 1/2008 | Rosenthal et al. | 29/829 |
| 2008/0170982 A1* | 7/2008 | Zhang et al. | 423/447.3 |
| 2010/0044069 A1* | 2/2010 | Stewart | 174/110 SR |
| 2010/0154975 A1* | 6/2010 | Feng et al. | 156/150 |
| 2010/0259866 A1* | 10/2010 | Shaffer et al. | 361/502 |

OTHER PUBLICATIONS

Machine Translation of JP 06284750, "Laminated Electrostatic Actuator", Otsuak et al., Oct. 7, 1994.*

N.C.S. Goulbourne, "Cylindrical Dielectric Elastomer Actuators Reinforced With Inextensible Fibers"Smart Structures and Materials 2006: Electroactive Polymer Actuators and Devices (EAPAD) (San Diego, CA, USA: SPIE, 2006) 61680a-12 (2006).

F.Carpi and D. De Rossi, "Dielectric Elastomer Cylindrical Actuators: Electromechanical Modelling and Experimental Evaluation", Materials Science and Engineering 24 555-62 (2004).

\* cited by examiner

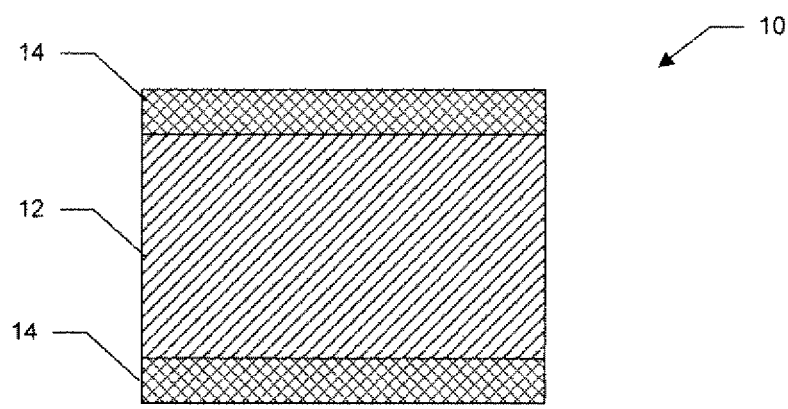
1(A)
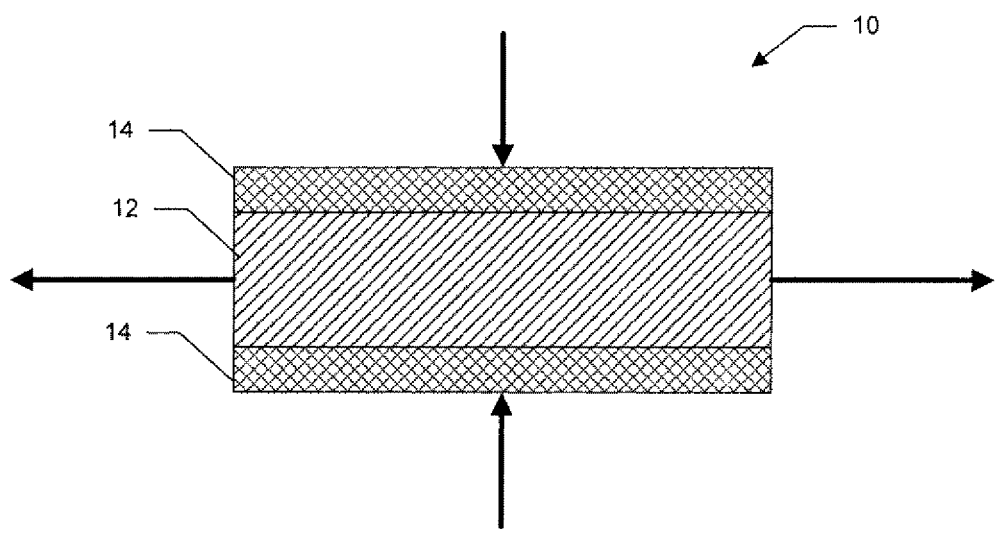
1(B)
FIG. 1
(prior art)

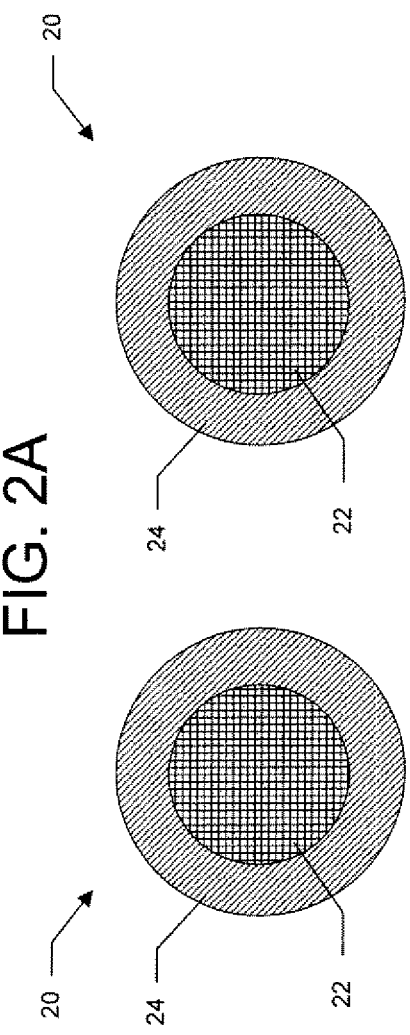
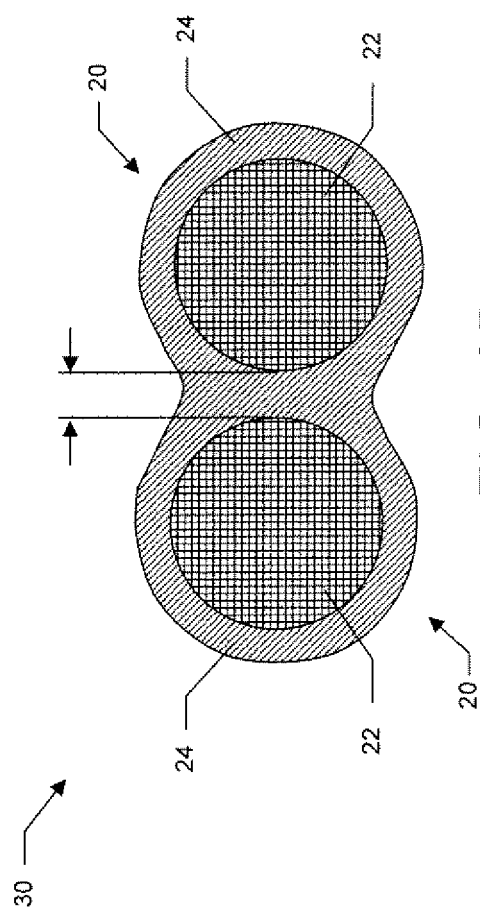

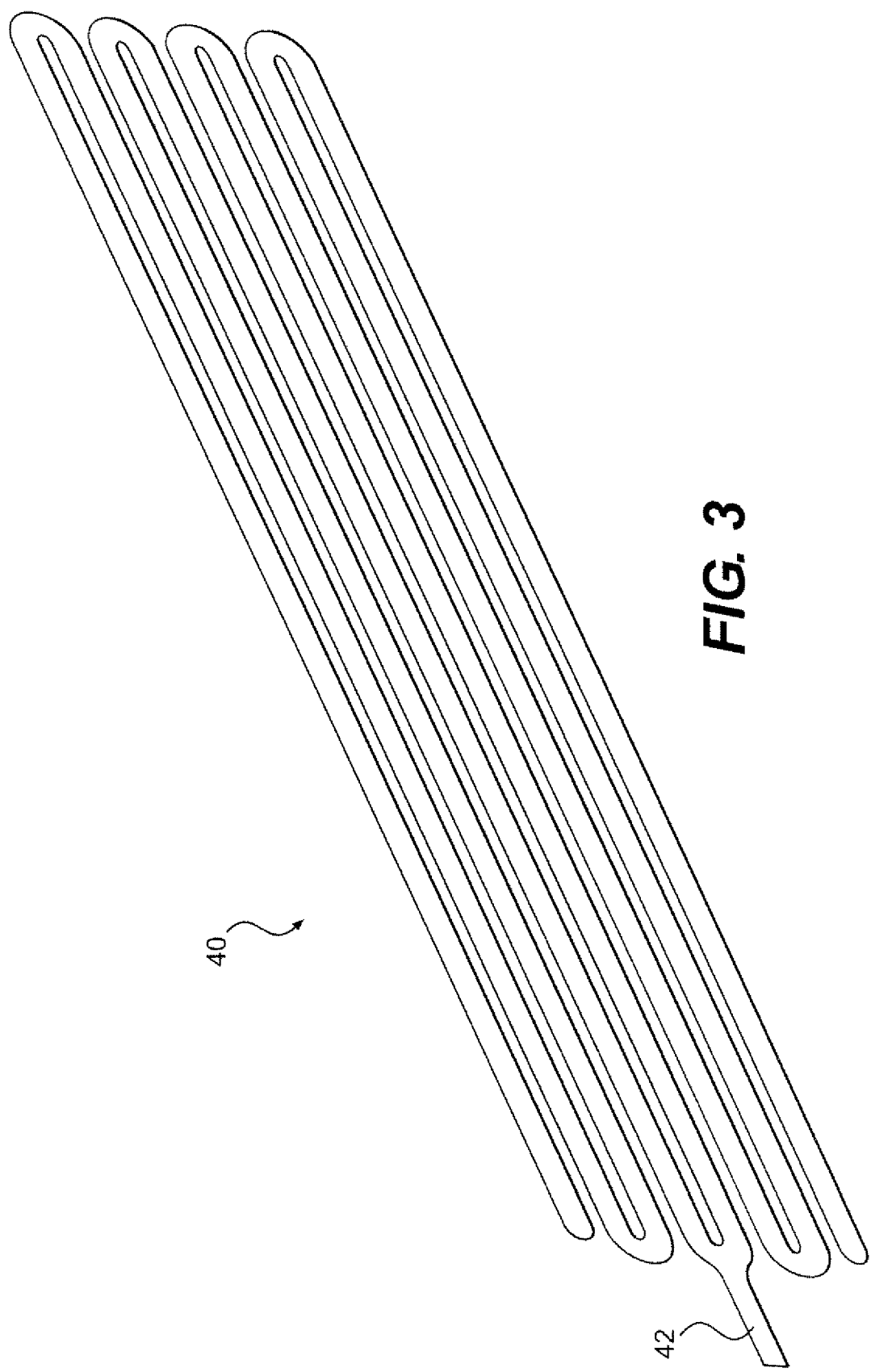

ASYMMETRIC DIELECTRIC ELASTOMER COMPOSITE MATERIAL

Pursuant to 35 U.S.C. §119, the benefit of priority from provisional application 61/091,017, with a filing date of Aug. 22, 2008, is claimed for this non-provisional application.

ORIGIN OF THE INVENTION

This invention was made by an employee of the United States Government and may be manufactured and used by or for the Government of the United States of America for governmental purposes without the payment of any royalties thereon or therefor.

FIELD OF THE INVENTION

The present invention relates generally to dielectric elastomers.

BACKGROUND

Dielectric elastomers (DE's) have been studied as a candidate active material a for morphing aircraft, synthetic jets artificial muscle and numerous other active material applications. Prior dielectric elastomer devices exhibited large actuation strains, but low output forces. The low shear modulus and equally small tensile stiffness of the material are responsible for the low force output.

Prior DEs, such as DE 10 illustrated in FIG. 1, begin with a sheet form of polyacrylate or other fully-cured elastomer 12. The most common elastomer used in current DE devices is polyacrylate adhesive tape, which is commercially available in 0.50 mm and 1.00 mm thicknesses. This elastomer is a permanently tacky compound used in high performance double-sided adhesive applications. The use of an existing fully-cured sheet form limits the options for fiber arrangement. In addition, the sheet form makes the introduction of compliant electrodes difficult. Other embodiments use elastomer tubing for cylindrical actuators. These are also limited by the available thicknesses of cured elastomer tubing forms.

The cured polyacrylate elastomer 12 is sandwiched between two compliant electrodes 14. FIG. 1A shows the prior DE without voltage applied, and FIG. 1B shows the prior DE with voltage applied. When voltage is applied, the DE decreases in thickness (illustrated by the vertical arrows in FIG. 1B) and increases in size in the in-plane direction (illustrated by the horizontal arrows in FIG. 1B).

Prior DEs employ a highly compliant electrode to carry the necessary electrical charge while allowing for the large displacements in the in-plane direction. This has been accomplished by a series of conductive fluid carriers (greases or pastes) with various conductive materials (carbon, silver, carbon nanotubes, etc.) in sufficient quantities to percolate, or form a conductive network capable of transporting the electrical charge during actuation. Use of fluid-like electrodes makes assembly difficult and limits the reliability and resistance to environmental hazards such as dust dirt, chemicals, and UV exposure. The grease and paste electrodes create similar problems for planar as well as cylindrical DE devices.

Another problem plaguing prior DE systems is the need for very large voltages (>2000 volts) to actuate the material. The voltage required is inversely proportional to the distance between electrodes. The fixed-thickness sheet form fixes the electrode spacing, making it impossible to reduce the operating voltages.

Another issue with prior DEs is the stress state under which they operate. Elastomers are weak in shear and weak in tension, but have a very high bulk modulus. Prior DE devices load the material in tension and rely on their near incompressibility to convert actuation in one direction to displacement in an orthogonal plane. Unfortunately, this loads the material in tension and accounts for the low displacement forces. Prior DE actuators expand upon activation. For this reason, devices employing them must be designed to provide prestrain prior to the application of electrical charge.

BRIEF SUMMARY

Embodiments of the present invention provide an asymmetric dielectric elastomer (ADE) which is an electronic active material that converts a voltage input to a mechanical force and mechanical displacement output. As compared to prior dielectric elastomer (DE) systems, the material of embodiments of the invention has reduced electrode spacing, which lowers significantly the required operating voltage. In addition, the inclusion of a combination of conducting and/or nonconducting reinforcing fibers greatly enhances the strength of the material, without significant weight penalty.

In one embodiment of the invention, dielectric elastomer composite material comprises a plurality of elastomer-coated electrodes arranged in an assembly. Each of the plurality of elastomer-coated electrodes may comprise an electrically conductive fiber. Each electrically conductive fiber may be individually elastomer-coated prior to being arranged in the assembly. The plurality of elastomer-coated electrodes may be one of (a) twisted together, (b) braided together, or (c) woven together in the assembly.

At least one of the plurality of elastomer-coated electrodes may comprise two or more electrically conductive fibers arranged in a sub-assembly. The two or more electrically conductive fibers arranged in a sub-assembly may be one of (a) twisted together, (b) braided together, or (c) woven together. The sub-assembly may be individually elastomer-coated prior to being arranged in the assembly.

Each of the plurality of elastomer-coated electrodes may comprise an electrically conductive sheet, each sheet comprising opposing planar sides. Each electrically conductive sheet may be individually elastomer-coated prior to being arranged in the assembly, either on (a) one side only or (b) both sides. The elastomer-coated electrodes may be in a stacked arrangement in the assembly.

In addition to the dielectric elastomer composite material, as described above, other aspects of the present invention are directed to corresponding methods of manufacturing a dielectric elastomer composite material.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a simplified cross-sectional view of a dielectric elastomer according to the prior art;

FIGS. 2A and 2B are simplified cross-sectional views of a dielectric elastomer composite material, in accordance with embodiments of the present invention;

FIG. 3 is a perspective view of a compliant conductor of a dielectric elastomer composite material, in accordance with embodiments of the present invention;

DETAILED DESCRIPTION

Embodiments of the present invention provide a dielectric elastomer composite material comprising a plurality of elastomer-coated electrodes arranged in an assembly. Embodiments of the invention provide improved force output over prior DEs by producing thinner spacing between electrode surfaces. This is accomplished by coating electrodes directly with uncured elastomer in liquid form, allowing the elastomer to cure, and then assembling a finished component (which may be termed an actuator) from coated electrode components.

In one embodiment of the invention, the dielectric elastomer composite material uses electrically conductive fibers as the electrodes. Each electrically conductive fiber may be individually elastomer-coated and allowed to partially cure prior to being assembled into a finished component. FIG. 2A is a cross-sectional view of two coated fibers 20. Each coated fiber comprises an electrically conductive fiber 22 coated with uncured elastomer 24. It is possible to use any fiber cross section such as round, square, etc. In one embodiment (such as illustrated in FIG. 2), the fibers may be approximately 500 microns in diameter with an approximately 50 micron elastomer coating thickness, although different fiber diameters and coatings thicknesses may be employed.

For fiber electrodes, the assembly process typically requires twisting, braiding, and/or weaving coated fibers into a textile-like assembly, although the coated fibers may be in a simple side-by-side arrangement. This assembly process is vastly different from either prepreg, wet lay-up, or resin transfer molded processes used in conventional passive structural composites. FIG. 2B is a cross-sectional view of two coated fibers 20 assembled into a finished component 30. The fibers are arranged such that individual fibers can be excited by either a positive or negative electrical charge. The fiber spacing (illustrated by the arrows in FIG. 2B) is controlled by the coating thickness. The electrodes are displaced by the electrical charges, and the material displacement is converted to act along the axis of the fibers.

Figure 8A:
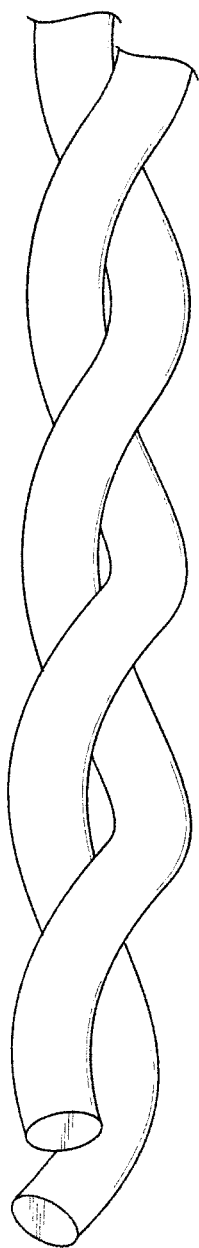
FIGS. 8A, 8B and 8C are top views of assemblies of elastomer-coated conductors, in accordance with embodiments of the present invention.
Figure 8B:
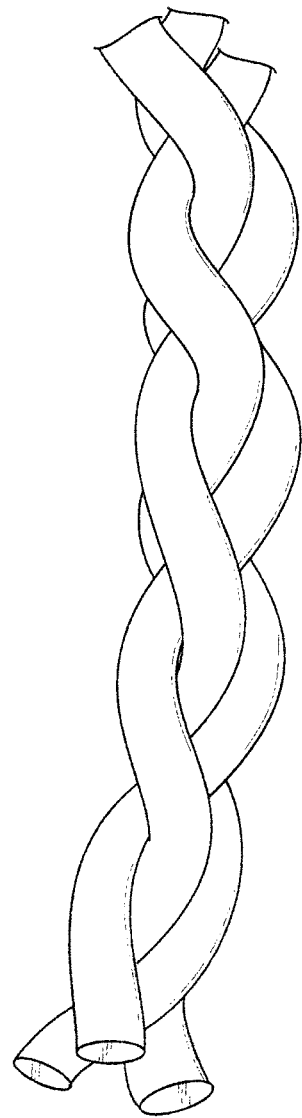
Figure 8C:
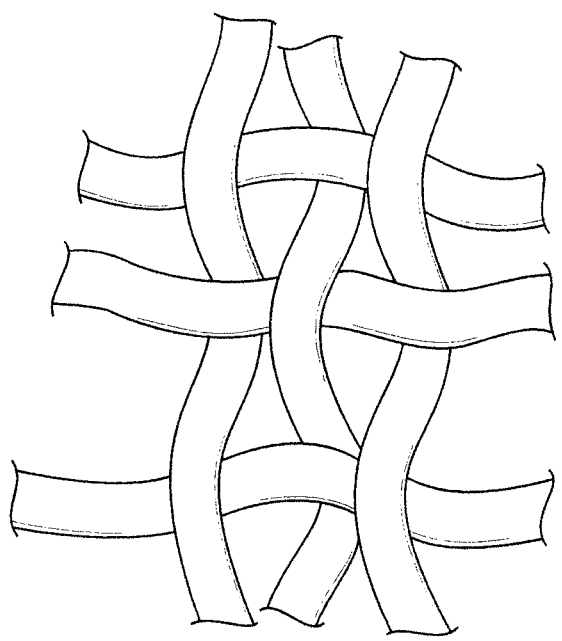

In addition to coating individual fibers as described above, individual strands may be combined (e.g., twisted, braided, woven (as illustrated in FIGS. 8A, 8B and 8C, respectively) or arranged side-by side) into a sub-assembly (which is commonly called a tow) prior to coating. There is no restriction on the shape of a "fiber" tow. Each sub-assembly is individually coated, and the coated sub-assemblies are arranged into a finished component. The coated sub-assemblies may be arranged into a finished component by being twisted together, braided together, and/or woven together. In one embodiment, the plurality of electrically conductive fibers can be arranged in a substantially parallel arrangement in the assembly.

Figure 4:
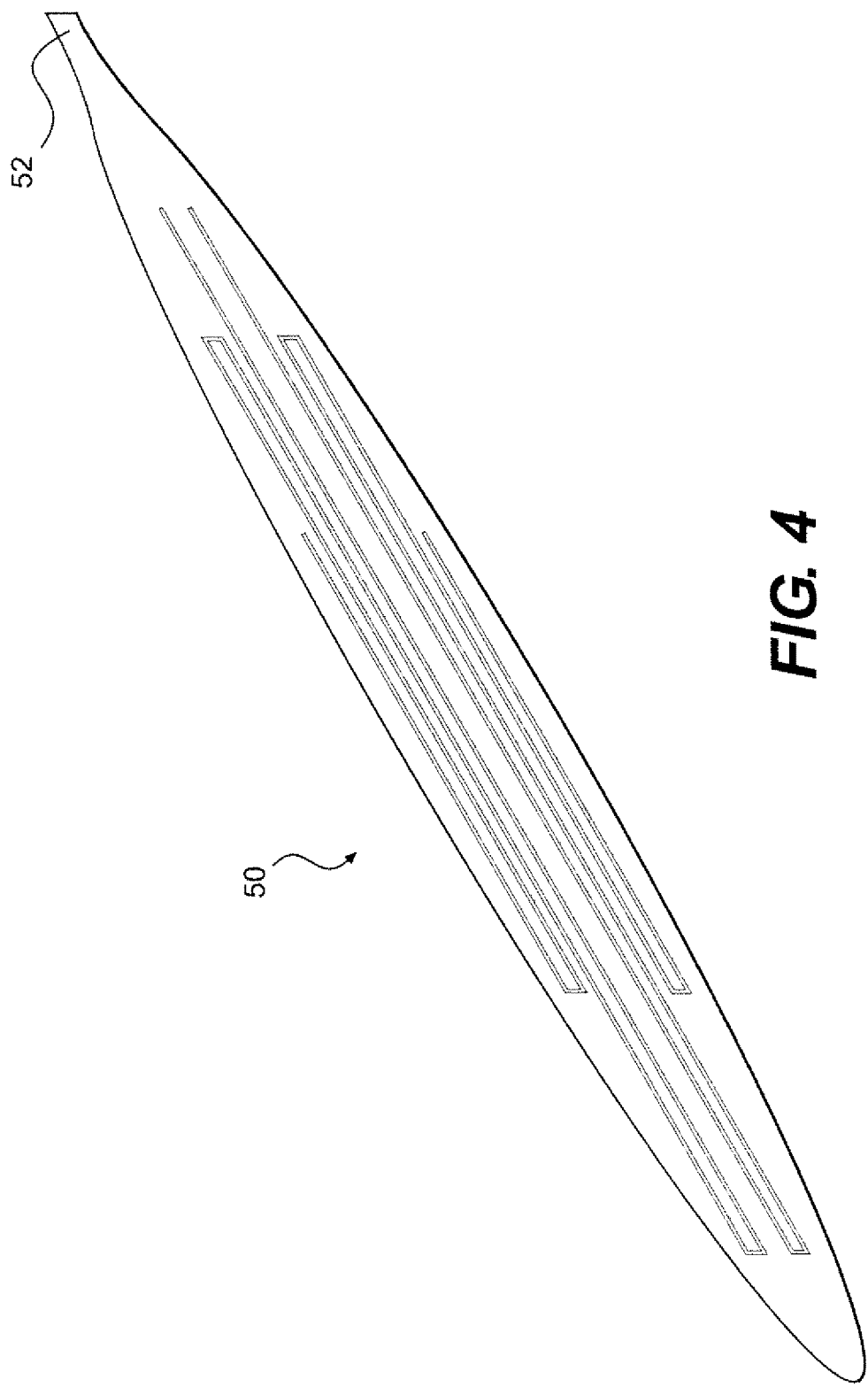
FIG. 4 is a perspective view of a compliant conductor of a dielectric elastomer composite material, in accordance with embodiments of the present invention.

In an alternative embodiment of the invention, each of the plurality of elastomer-coated electrodes comprises a thin, electrically conductive sheet with opposing planar sides. In one embodiment of the invention (such as illustrated in FIG. 4), the sheets may be approximately 100 microns thick, approximately 25 millimeters wide, and approximately 12 millimeters high. The coating thickness is about 50 microns. Other dimensions for each of the foregoing are possible. Each electrically conductive sheet is individually elastomer-coated prior to being arranged (i.e., stacked) into a finished component. The electrically conductive sheet may be elastomer-coated on one side only or on both sides.

FIG. 3 is a perspective view of one such uncoated sheet electrode. The sheet electrode 40 of FIG. 3 has a serpentine pattern with an overall generally rectangular shape. An electrical lead 42 remains uncoated and enables a voltage to be applied to the electrode.

Figure 5:
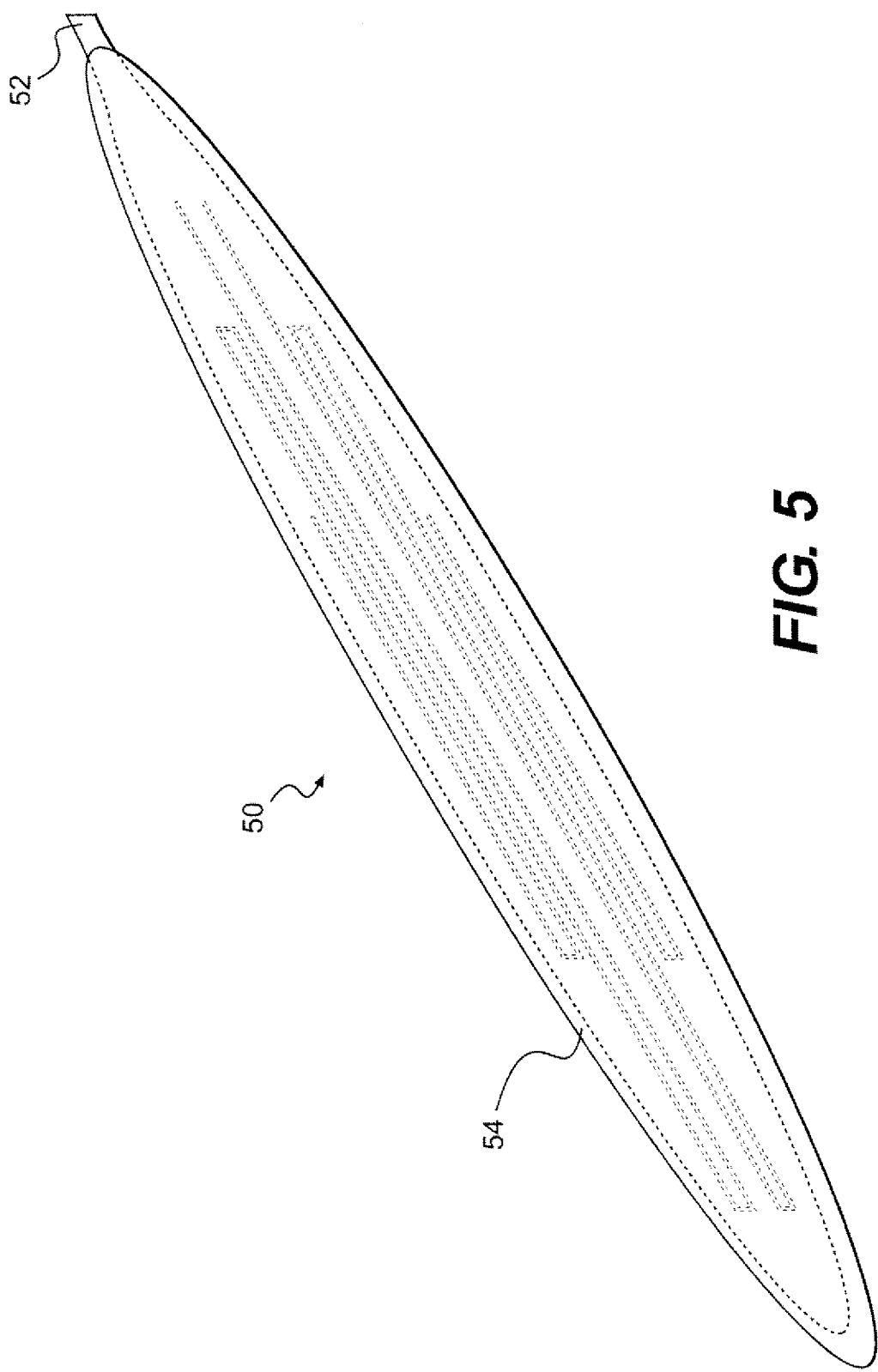
FIG. 5 is a perspective view of the conductor of FIG. 4 coated with elastomer.

FIG. 4 is a perspective view of another such uncoated sheet electrode. The sheet electrode 50 of FIG. 4 has an overall monolithic elliptical shape with a pattern of slots formed therein. A lead 52 remains uncoated and enables a voltage to be applied to the electrode. FIG. 5 illustrates the conductor 50 of FIG. 4 with an elastomer coating 54. Note that the lead 52 remains uncoated.

Figure 6:
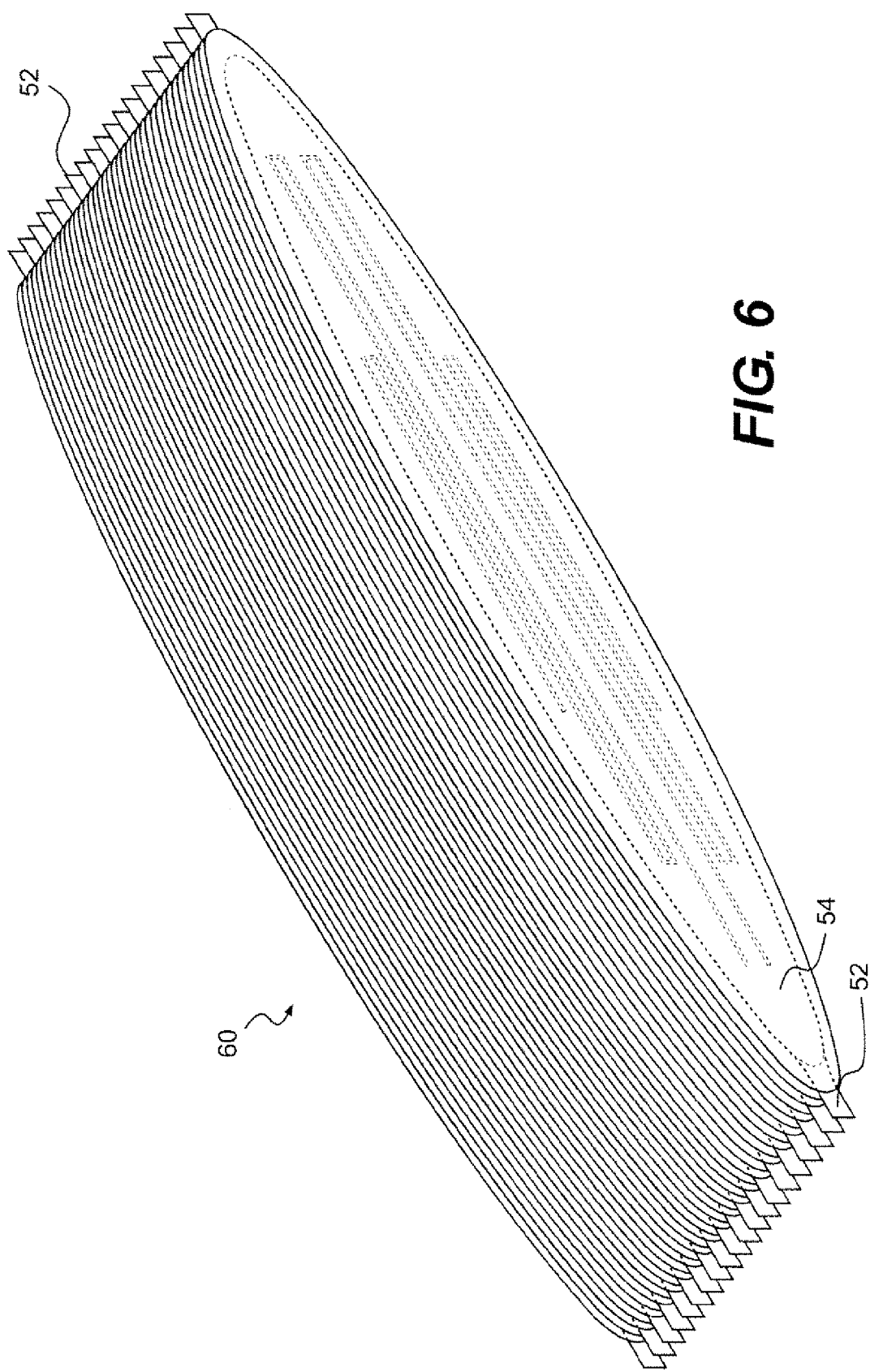
FIG. 6 is a perspective view of an assembly of elastomer-coated conductors, in accordance with embodiments of the present invention.

FIG. 6 is a perspective view of an assembly 60 comprising the elastomer-coated conductors of FIG. 5. The assembly 60 comprises a plurality of elastomer-coated conductors (39 are illustrated in FIG. 6, but any number may be used as desired) in a stacked arrangement. The elastomer-coated conductors are assembled for opposite polarity, in that alternate ones of the elastomer-coated conductors are positioned such that their leads 52 are on opposite ends of the assembly as illustrated in FIG. 6.

Figure 7:
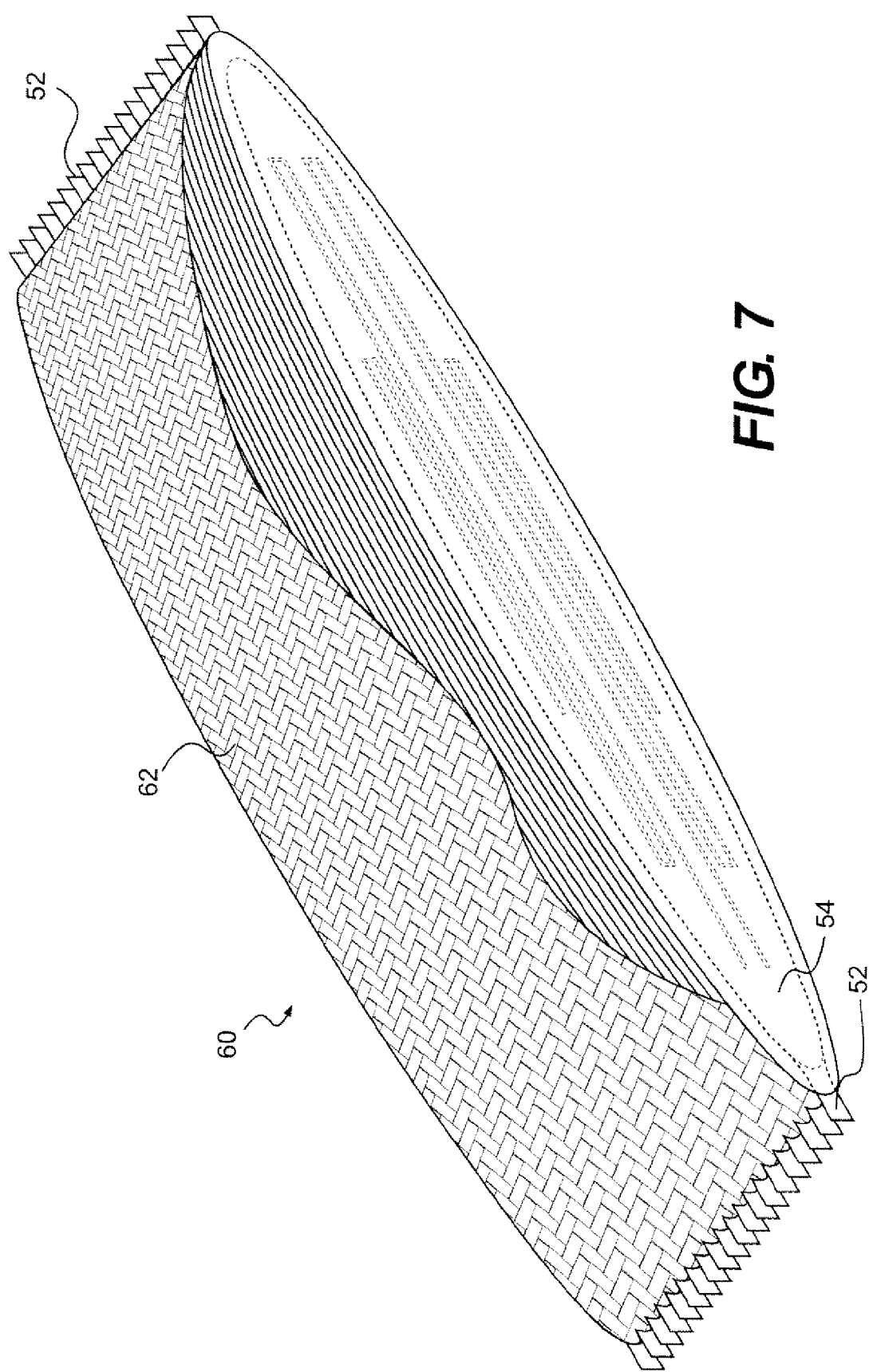
FIG. 7 is a perspective view of an assembly of FIG. 6, illustrating an overwrap.

Additional fibers, woven materials or other such covering can be assembled over the active electrode assembly. These overwrapped materials provide additional stiffness in one or more preferred directions. The actual arrangement of overwrap will determine the output characteristics—unidirectional, bidirectional, axial, transverse, angular—depending upon the type, orientation and cross sectional geometry of the overwrap material(s). In operation, the individual electrodes are attracted to each other by the application of electric charge. The incompressible nature of the elastomer converts the axial displacement of the electrodes to transverse displacement. The overwrap ensures the actuator remains at constant volume, and the elastomer is loaded only in compression. The overwrap then converts the transverse displacement of the matrix to an axial displacement of the fibers. It is through this coupling mechanism that the high bulk modulus of the elastomer is exploited—without significant shear or tensile loading of the elastomer. Tensile stresses are transmitted by the high modulus fibers. FIG. 7 is a perspective view of an assembly 60 of FIG. 6 having an overwrap 62 (partially cutaway in FIG. 7).

The fibers and thin sheets that comprise the electrodes may be made of any suitable conductive material, such as metal or graphite.

The actuators of embodiments of the invention contract upon actuation. This makes their operation more similar to natural muscle than prior DE materials—which expand in the load direction upon actuation.

The Maxwell Stress Tensor between two elastomer-coated conductors is expressed by the following equation:

$$T_{ij} = \varepsilon_0 \varepsilon_r \left( E_i E_j - \frac{1}{2} \delta_{ij} E^2 \right);$$

in which $\in_0$ is the relative permittivity of free space; $\in_r$ is the relative permittivity of the dielectric elastomer; $E_i$ and $E_j$ are electric field components in tensor notation; $\delta_{ij}$ is the Kronecker delta; and E is the norm of the electric field components. For elastomer-coated electrodes of embodiments of the invention, there is no requirement for a flat electrode either before or after coating with elastomer. There is no limit to the number of patterns that may be employed. The pattern of the electrode can be tailored without loss of generality to enhance performance or reliability for a particular application. Two potential patterns of sheet electrodes are shown, but there are numerous other possibilities that could be designed and which are within the scope of this invention.

The overwrap may be comprised of individual fibers, flat tows, or sheet products, and may be made of conductive materials, non-conductive materials, or a combination of conductive and non-conductive materials. Regardless of the alternate embodiments, the purpose of the overwrap is to convert the transverse displacement of the elastomer matrix to tensile stresses while loading the elastomer in a state of hydrostatic pressure.

These assemblies of elastomer-coated electrodes may be operated as sensors by the conversion of mechanical input into an electrical response. Electronically, these assemblies behave as capacitors and may be used in sensing circuits that exploit electrical changes under loading. It is possible to combine sensor function and actuator function in the same device by having separate actuation and sensor regions within a particular cross section. For the sheet actuators, this could be accomplished by having a separate actuator and sensor electrode in the same cross section. In particular, the inner region could be devoted to sensor function, with a separate electrode in the outer region devoted to actuator function. Appropriate shielding to avoid electrical interference could be designed into the same region using a third electrode region.

The unique features of embodiments of the invention include at least the following:

Actuators may be produced that have higher force output than prior DE materials.

Actuators may be produced that contract upon actuation. Current DE actuators expand upon actuation.

Stacked sheet electrodes produce significant axial forces by ensuring the elastomer is loaded in a state of hydrostatic stress, thus exploiting the high bulk modulus of the elastomer.

Coating electrodes with uncured elastomer, and then assembling electrodes by weaving or stacking allows precise control over electrode spacing which allows lower operating voltages.

Stacked sheet electrode systems can be optimized to provide preferential actuation characteristics in particular directions.

Actuators can be coated with various coatings for protection from environmental hazards and contaminants (dust, aerosols, chemicals, UV, etc).

Sensor and actuator functions can be designed into the same electrode-elastomer system.

Potential commercial applications of embodiments of the invention include: morphing aircraft; active damping; distributed actuator systems; artificial muscle; artificial heart; prosthetics; physical therapy/rehabilitation devices; robotics; biometric devices; displacement/force sensors; and active structures.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed as new and desired to be secured by Letters Patent of the United States is:

1. A dielectric elastomer composite material comprising:
   a plurality of elastomer-coated compliant electrodes arranged in an assembly, each of the plurality of elastomer-coated electrodes comprising an electrically conductive fiber, each electrically conductive fiber being individually elastomer-coated prior to being arranged in the assembly, and
   an overwrap at least partially surrounding the assembly, the overwrap comprising a material selected to resist displacement of the assembly in one or more directions and to convert axial displacement of the plurality of electrodes to transverse displacement.

2. The material of claim 1, wherein at least one of the plurality of elastomer-coated electrodes comprises two or more electrically conductive fibers arranged in a sub-assembly.

3. The material of claim 2, wherein the two or more electrically conductive fibers arranged in a sub-assembly are twisted together.

4. The material of claim 2, wherein the two or more electrically conductive fibers arranged in a sub-assembly are braided together.

5. The material of claim 2, wherein the two or more electrically conductive fibers arranged in a sub-assembly are woven together.

6. The material of claim 1, wherein the plurality of electrically conductive fibers are arranged in a substantially parallel arrangement in the assembly.

7. A dielectric elastomer composite material comprising:
   a plurality of elastomer-coated compliant electrodes arranged in a stacked assembly, each of the plurality of elastomer-coated electrodes comprising an electrically conductive sheet, each sheet comprising opposing planar sides, each electrically conductive sheet being individually elastomer-coated on both sides prior to being arranged in the assembly, and
   an overwrap at least partially surrounding the assembly, the overwrap comprising a material selected to resist displacement of the assembly in one or more directions and to convert axial displacement of the plurality of electrodes to transverse displacement.

8. The material of claim 7, wherein each of the plurality of electrically conductive sheets comprise an electrical lead, and wherein each of the plurality of electrically conductive sheets is elastomer-coated except the electrical lead.

9. The material of claim 7, wherein each of the plurality of electrically conductive sheets comprise an electrical lead, and wherein alternate ones of the plurality of electrically conductive sheets are arranged in the assembly such that the leads of alternate ones of the plurality of electrically conductive sheets are on opposite ends of the assembly.

10. A dielectric elastomer composite material comprising:
a plurality of elastomer-coated compliant electrodes arranged in a stacked assembly, each of the plurality of elastomer-coated electrodes comprising an electrically conductive sheet, each sheet comprising opposing planar sides, each electrically conductive sheet being individually elastomer-coated on both sides prior to being arranged in the assembly, and
an overwrap at least partially surrounding the assembly, the overwrap comprising a material selected to resist displacement of the assembly in one or more directions.

11. The material of claim 10, wherein the overwrap further comprising a material selected to convert axial displacement of the plurality of electrodes to transverse displacement.

12. The material of claim 10, wherein the overwrap further comprising a material selected to convert hydrostatic pressure of the plurality of electrodes to axial displacement.

13. The material of claim 10, wherein the overwrap further comprising a material selected to convert hydrostatic pressure of the plurality of electrodes to transverse displacement.

14. The material of claim 10, wherein each of the plurality of electrically conductive sheets comprise an electrical lead, and wherein each of the plurality of electrically conductive sheets is elastomer-coated except the electrical lead.

15. The material of claim 10, wherein each of the plurality of electrically conductive sheets comprise an electrical lead, and wherein alternate ones of the plurality of electrically conductive sheets are arranged in the assembly such that the leads of alternate ones of the plurality of electrically conductive sheets are on opposite ends of the assembly.

* * * * *